United States Patent [19]
Schneider

[11] 3,941,186
[45] Mar. 2, 1976

[54] WATER-COOLED HIGH-TEMPERATURE SLIDE VALVE, ESPECIALLY HOT BLAST SLIDE VALVE

[75] Inventor: Heinz Schneider, Duren-Lendersdorf, Germany

[73] Assignee: Zimmermann & Jansen GmbH, Duren, Germany

[22] Filed: May 29, 1974

[21] Appl. No.: 474,432

[52] U.S. Cl. .................. 165/47; 137/340; 165/95; 165/168; 165/169
[51] Int. Cl.² ........................................ F28F 19/00
[58] Field of Search .................. 165/47, 168–170, 165/95; 137/340

[56] References Cited
UNITED STATES PATENTS

| | | | |
|---|---|---|---|
| 3,267,954 | 8/1966 | Uerlichs | 137/340 |
| 3,487,849 | 1/1970 | Vietorisz | 137/340 |
| 3,499,462 | 3/1970 | Berczynski | 137/340 |
| 3,511,262 | 5/1970 | Vietorisz | 137/340 X |
| 3,552,423 | 1/1971 | Vietorisz | 137/340 |

FOREIGN PATENTS OR APPLICATIONS

| | | | |
|---|---|---|---|
| 1,550,210 | 7/1969 | Germany | 137/340 |

*Primary Examiner*—Albert W. Davis
*Assistant Examiner*—Sheldon Richter
*Attorney, Agent, or Firm*—Haseltine, Lake & Waters

[57] ABSTRACT

The present invention relates to a water-cooled high-temperature slide valve, especially hot blast slide valve, including within the housing thereof annular passages for the coolant (water) and extending from the upper portion of the slide valve along the sealing bars on both peripheral sides to the lower portion of the housing and opening into at least one cooling passage through transfer ports provided in this position, which cooling passage extends back around the portion of said housing arranged about the slide valve plate to the upper portion of said housing in which the coolant outlet is situated, wherein the cross-sectional flow area of said cooling passage within which the coolant is returned, at least in its lower portion extending over an arc of 180°, is smaller than, and at most as great as, the overall cross-sectional flow area of said annular passages.

9 Claims, 4 Drawing Figures

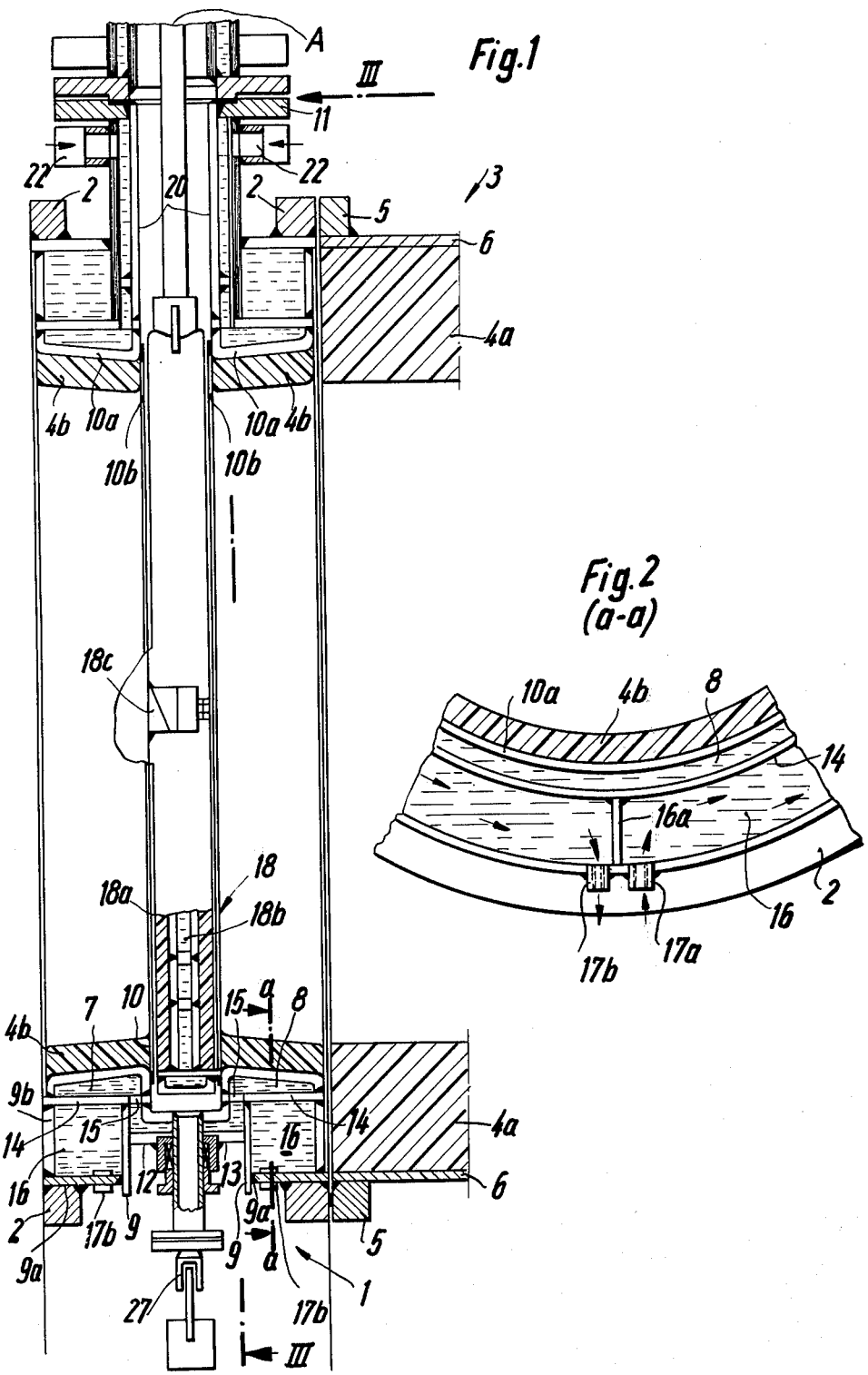

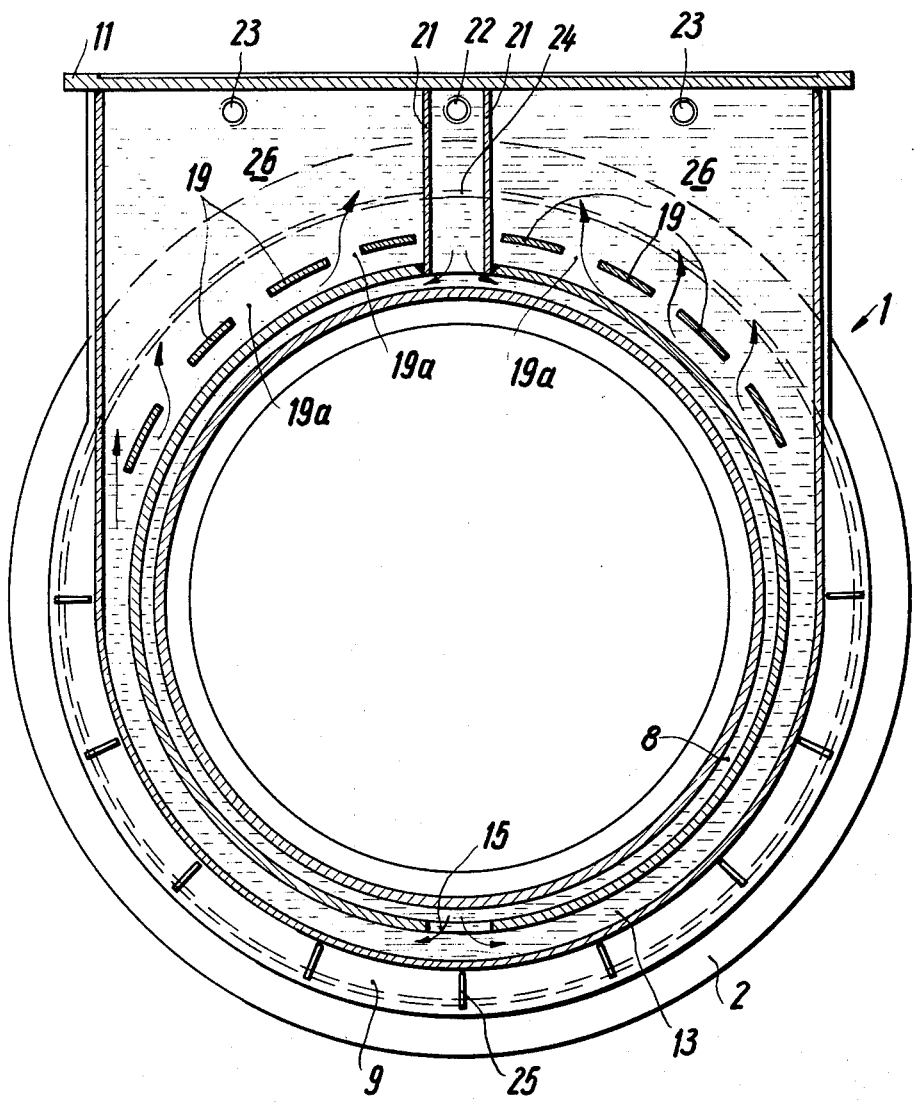

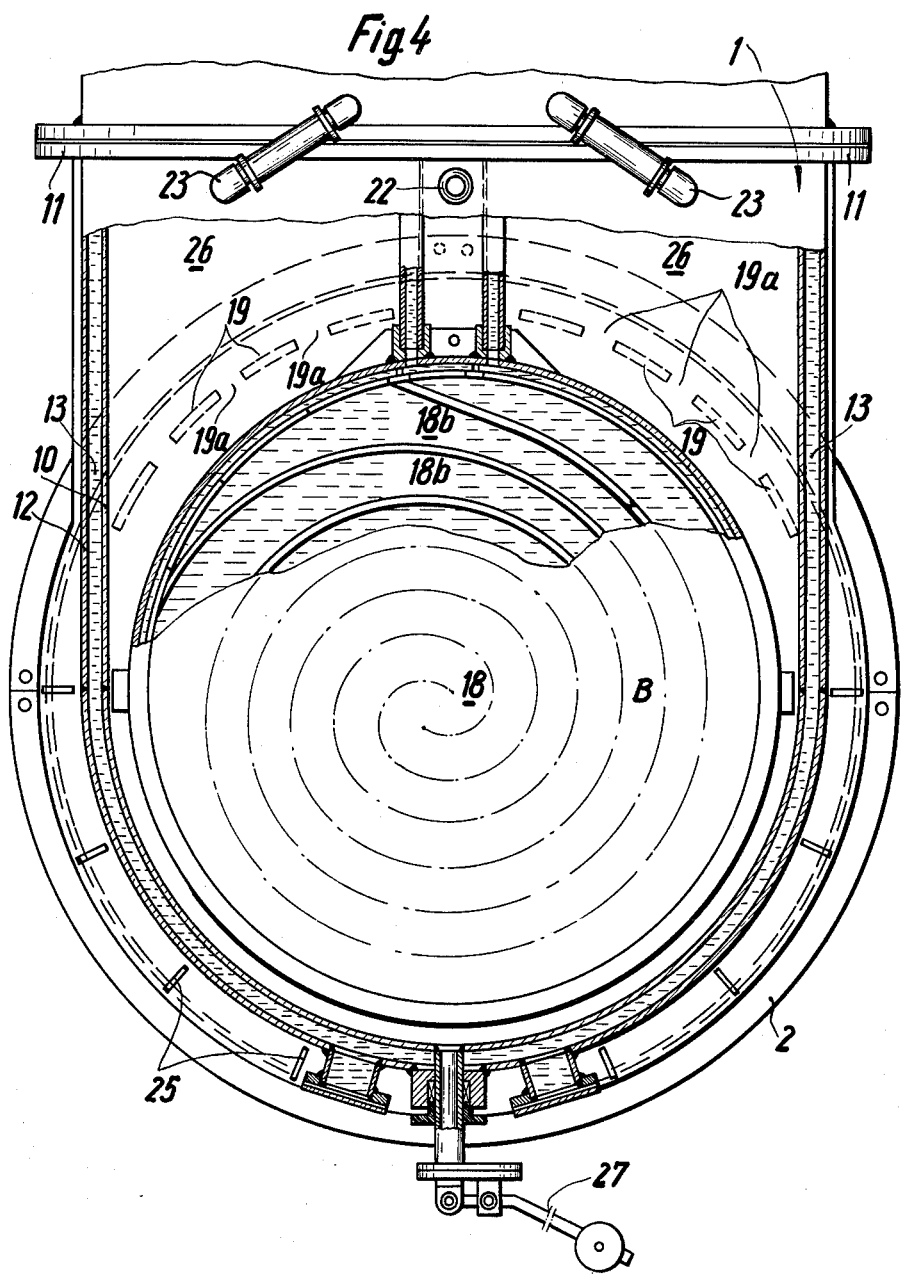

WATER-COOLED HIGH-TEMPERATURE SLIDE VALVE, ESPECIALLY HOT BLAST SLIDE VALVE

The present invention relates to a water-cooled high-temperature slide valve, especially hot blast slide valve, including within the housing thereof annular passages for the coolant (water) and extending from the upper portion of the slide valve along the sealing bars on both peripheral sides to the lower portion of the housing and opening into at least one cooling passage through transfer ports provided in this position, which cooling passage extends back around the portion of said housing arranged about the slide valve plate to the upper portion of said housing in which the coolant outlet is situated. (German Pat. Nos. 1550210 or 1962953, respectively.)

The constantly increasing diameters of the conventional hot blast slide valves result in an increasing thermal load or stress on such slide valves, which stress can not longer be counteracted adequately with an improvement of the materials employed only.

It is known to provide the slide valve plate and the housing of hot blast slide valves with a refractory brickwork and to cool them with a coolant, especially water. Hereby, especially the region of the sealing strips or bars must be cooled very efficiently. In the cooling system employed, it is contemplated that suspended solid particles present in the cooling water and which, in addition to being introduced by the cooling water itself, may also result from rust particles, dislodged paint particles or the like, settle within the cooling passages at places particularly provided to this end where such particles can be removed from time to time. Precautions of these kind are necessary because temporary failure of the cooling system or settling of suspended matter, even if in thin layers, at undesired positions might result in substantial damage of the construction of the hot blast slide valves.

In order to positively avoid clogging and, thus, possible local damages of the slide valves, in the conventional structures the cooling passages, particularly in their return portions, are intentionally designed with increased cross-sectional dimensions so that the suspended particles may settle at the points provided to this end. However, this results in a certain limitation of the flow velocity of the coolant whereby the cooling efficiency, again, is subject to a certain limitation because the heat-transfer coefficient increases with the flow velocity of the coolant. The problems resulting herefrom are further aggrevated by the continually increasing contamination of the cooling water employed as well as by the greatly increased quantities of cooling water which are required in large-size slide valves.

Accordingly, it is the object of the present invention to improve in high temperature slide valves, especially hot blast slide valves, the reliability and the effectiveness of the cooling, and that while at the same time simplifying the housing construction and by rendering it less expensive and reducing the space requirement thereof.

Consequently, in a hot blast slide valve of the type as outlined at the beginning the invention resides in that the cross-sectional flow area of said cooling passage within which the coolant is returned, at least in its lower portion extending over an arc of 180°, is smaller than, and at most as great as, the overall cross-sectional flow area of said annular passages.

In this way, it is rendered possible according to the invention to pass all suspended solid particles involved through the housing cooling system because of the flow velocity of the coolant which exceeds the descending speed of such particles, thereby eliminating the danger of a sumplike or even thin film-like settling of such particles. The increased flow velocity also prevents the formation of air pockets and film evaporation which are similarly disadvantageous in thermal respects, such that premature wear due to local overheating is avoided. This intentionally increased flow velocity of the coolant improves the cooling effect in the region of the sealing faces along the annular passages. Besides, the increased flow velocity provides for an improved control of the cooling effect. Finally, the reduction of the cross-sectional areas of the cooling passages also results in lesser space requirements of the housing construction.

Improved uniformity of the cooling effect is obtained if the cooling passage for the return of the coolant, at least over portions thereof, has a heat-conducting wall in common with the annular passages.

Important additional advantages and effects can be obtained in a hot blast slide valve of the type in question if there are provided radially outwardly of said annular passages, additional or auxiliary cooling passages which are separately supplied with coolant through inlets and outlets and which are annularly arranged around said annular passages adjacent the mounting flanges.

In a combined double cooling system of this type, it is of advantage if said auxiliary cooling passages have a greater cross-sectional area than said annular passages, and if said auxiliary cooling passages at least partially have heat-conducting walls in common with said annular passages and with the coolant return passage thereof. Also, the cooling effect can be improved in that said inlets and outlets are disposed in part in counter-current relation to said annular passages. A particular combination of the cooling effect can be obtained if the cross-sectional flow areas of said annular passages and of said cooling passage are relatively small to produce a high velocity of the coolant, while the cross-sectional flow areas of the auxiliary cooling passages are large in order to produce a lower flow velocity of the coolant.

While the above defined independent additional cooling means provides for a particularly flexible adaption of the housing of the hot blast slide valves to the most varied constructional and operational situations, in special cases it may be sufficient to form the space occupied by the additional cooling passages within the housing jacket as open, air-cooled or at least partially lined annular spaces.

In the following, the invention is explained in greater detail in an exemplary embodiment by referring to the accompanying drawings, wherein:

FIG. 1 is a longitudinal sectional view through a high temperature slide valve, especially a hot blast slide valve according to the invention;

FIG. 2 is an enlarged part cross-sectional view taken along lines a-a in FIG. 1;

FIG. 3 is a cross-sectional view taken along lines III—III in FIG. 1; and

FIG. 4 is a cross-sectional view similar to FIG. 3, taken approximately along the front face of the slide valve plate and showing additional details and with the wall of the valve plate being partially broken away.

As shown in FIGS. 1, 3 and 4, the lower portion of the housing 1 of a hot blast slide valve is provided at the axial ends thereof with mounting flanges 2 by means of which the valve is connected to corresponding connection flanges 5 of a pipeline 3 with the radially abutting flange faces being sealed against each other. In order to reduce thermal losses, and particularly to provide protection against excessive temperature stresses of its steel jacket 6, the pipeline 3 is provided at its inner face with a refractory brickwork or lining 4a forming an insulation against the temperature of the gases flowing through the pipeline.

The housing 1 of the hot blast slide valve is water cooled, and that primarily through annular passages 7 and 8 which are positioned on both sides on the edge of a likewise water cooled valve plate 18 and which are supplied with cooling water via water inlets 22. In the Figures, only the lower portion of the hot blast slide valve is shown, which portion through shaft mounting flanges 11 is connected to the shaft portion or casing attachment of the slide valve which also includes the (not illustrated) actuating means for moving the valve plate 18 along the center axis A.

The valve plate 18 may likewise be provided with a refractory lining 18a on both faces thereof, and it may have water cooling passages 18b interiorly thereof, which passages are supplied with cooling water independently of the cooling of the housing 1. Besides, the valve plate 18 may be provided with slide valve wedges 18c.

Although a refractory brickwork or lining 4b may be provided on the inner face of the housing 1, the jacket construction of the housing 1 must be cooled by means of water. To this end, the jacket construction of the housing 1 includes on both sides of the peripheral edge of the valve plate 18 an inner, channel-shaped annular passage wall 10a each, which walls mount sealing bars 10b at their sides directed towards the valve plate so as to cool these sealing bars. The annular passage walls 10a are annularly disposed within the housing 1, and they form a hollow section which is defined by an intermediate wall or partition 14 at its radially outer side so as to form the annular passages 7 and 8 for the water cooling of the housing 1. The annular passages 7 and 8 extend each axially from the valve plate up to the outer plane of the respective mounting flanges 2. The cooling water is supplied through the cooling water inlets 22 in the upper portion of the housing 1 into the annular passages 7 and 8 via a port defined between front sheet metal plates 20 and partitions 21.

In the lowermost portion of each annular passage 7 and 8, there is each provided a transfer port 15 through which the cooling water from the annular passages enters a cooling passage 13 which cools the portion of the housing 1 around the edge of the valve plate 18 and which slightly overlaps the annular passages 7 and 8.

This cooling passage or channel 13 is defined by a central portion 10 positioned between the inner annular passage walls 10a, as well as by two radial side walls 9 and an outer wall 12 which latter wall extends in this configuration (FIG. 1) in the region of housing 1 positioned outside of the transverse axis B and spanning an arc of 180° of the circuumference of the housing.

The portion of the housing 1 above the transverse axis B is formed as a shaft or casing attachment for the retraction of the valve plate 18, which shaft is enclosed at its edges by bilateral extensions of the cooling passage 13 (FIG. 4) and at its axial sides by cooling water compartments 26 which are provided between the front sheet metal plates 20 and the outer wall of the housing 1. From these cooling water compartments 26, the cooling water then flows out through one or more cooling water outlets 23, optionally while cooling the upper portion of the hot blast slide valve, too.

In the lower portion of the annular groove within which the valve plate 18 is movable, there may be provided a pressure relief valve or over-pressure valve 27 which, along with its supply line, extends transversely through the cooling passage 13.

In the illustrated manner, the annular passages 7 and 8 form a first cooling phase which circulates annularly within the housing 1 and which is followed through the transfer ports 15 by the second cooling passage 13 which extends over at least the lower portion of the housing reaching over an arc of 180° and which, via the downstream cooling water compartments 26, forms the return path for the cooling water of the primary cooling system. Hereby, it is essential that the cross-sectional area of the cooling passage 13, at least in its portion below the transverse axis B, does not exceed the sum of the flow cross-sectional areas of the annular passages 7 and 8, or is even noticeably smaller than this sum. In this way, a sufficiently high flow pressure is maintained such that any solid material contained in the cooling water is not allowed to settle at the bottom of the cooling system, but is taken along to the outlets 23 for the cooling water. Thus, a flow velocity of the coolant exceeding the settling or descending speed of the solid particles is ensured.

In order to maintain a flow velocity of the cooling water sufficient to entrain any solid materials also in the cooling water compartment 26, particularly around the adjacent peripheral portion of the entrance of the pipe, special baffles 19 are provided within the cooling water space or compartment 26, which baffles fully span the compartment 26 (thereby additionally reinforcing such compartment) and which define between them predetermined gaps or ports 19a the overall cross-sectional area of which corresponds substantially to the cross-sectional area of the cooling passage 13, such that any solid materials present are conveyed into the space above the baffles 19 and discharged therefrom — optionally after a certain concentration — through the cooling water outlets 23 which are of sufficient width.

Due to the flow cross-sectional area of the cooling passage 13 which amounts at most up to the overall cross-sectional area of the annular passages 7 and 8, an additionally improved efficiency of cooling is obtained because of the increased flow velocity of the cooling water.

Radially outwardly of the annular pasages 7 and 8, the housing 1 may be provided in the customary manner with additional cooling fins, annular spaces or even with a lining.

However, deciding advantages are obtained if alternatively there is provided an auxiliary cooling system being independent of the primary cooling system and which can best be seen from FIGS. 1 and 2. To this end, cooling passages 16 are provided each exteriorly around the annular passages 7 and 8, which cooling passages in the lower portion of the housing may also be formed as a cooling channel or passage extending axially over both annular passages.

These cooling passages 16 each have at least partially in common with the annular passages 7 and 8 two walls, namely the intermediate wall or partition 14 and the side walls 9, such that an excellent heat transition to the cooling passages 16 is provided. Sufficient heat is transmitted to the auxiliary cooling system even from the cooling passage 13 through the outer wall 12 thereof which is welded to the side walls 9. Besides, the partition 14 extends over nearly the full axial extension of the annular passages 7 and 8 between the primary and the auxiliary cooling system, such that a large heat transition surface is present. The partition 14 could also be formed from a material of lesser thickness since it is disposed interiorly of the housing jacket 9a. The outer walls of the cooling passages 16 are formed by the housing jacket 9a which at the same time forms the outer peripheral limit of the cooling passages 16, and the axially outer end walls 9b. An additional cooling action is obtained by the arrangement of the cooling passages 16 adjacent the mounting flanges 2 which form supplementing cooling surfaces.

FIG. 2 illustrates the flow direction of the auxiliary cooling system through the cooling passages 16, whereby the cooling water entering through the inlet 17a upon circulation around the annular periphery of the cooling passage 16 which is formed as a simple loop by means of a partition 16a, flows back to the outlet 17b. In this connection, it has to be noted that — as shown — for cooling the annular passages 7 and 8 an auxiliary cooling flow through the cooling passages 16 directed in a partially counter-current fashion is of particular advantage. Interposed webs 25 may be further provided on the housing jacket 9a and/or on the side walls 9, which webs both reinforce the construction and improve the cooling action.

In view of the fact that the auxiliary cooling system through the cooling passages 16 functions entirely independently of the primary cooling system, the cooling effect of both systems can be better directed to their special functions — e.g. the primary cooling system may be employed for the efficient cooling of the sealing bars — and the overall cooling effect may be obtained by the combination of both cooling systems. For example, the primary cooling system may be deliberately constructed in somewhat under-dimensioned fashion and/or controlled with a high — and thus better controllable — flow velocity of the coolant, such that the freedom of clogging by solids deposit is still further improved, and the auxiliary cooling system may be combined therewith such as to have a correspondingly higher effectiveness. In this way, special cooling effects can be achieved and controlled more easily. Preferably, the auxiliary cooling system has a greater overall cross-sectional flow area and a noticeably lower coolant flow velocity than the primary cooling system.

The construction of the independent auxiliary cooling system or of the additional external cooling system, respectively, can also be realized with the inlet entering from below and the outlet positioned at the top as well as with a dual counter-current cooling rearrrangement.

Preferably, the construction of a hot blast slide valve as illustrated in the Figures consists of correspondingly shaped steel plates and steel profiles or sections which are welded together, preferably with protective powder, and which are readily accessible for welding them in succession.

What is claim is:

1. In a water-cooled high-temperature slide valve comprising a housing, a valve plate mounted movably within said housing, annular coolant passages extending from the upper portion of said housing along both peripheral sides thereof to the lower portion of the housing, a coolant return passage being provided within said housing radially outwardly of said annular passages in communication therewith and extending about the peripheral edge of said valve plate at least in the lower portion thereof, the improvement comprising at least one transfer port in the lower portion of each of said annular passages for transferring coolant from said annular passages into said return passage, the axial extent of said return passage being defined by radially extending side wall members spaced axially inwardly of the opposed ends of said housing and the cross-sectional flow area of said return passage, at least in its lower portion extending over an arc of 180°, is smaller than the overall cross-sectional flow area of said annular passages whereby settling of suspended matter is inhibited.

2. The slide valve according to claim 1, wherein an outlet for said coolant is provided in the upper portion of said housing, a cooling water compartment is arranged in the upper portion of said housing and is disposed in the flow path between said return passages and said coolant outlet, 6 baffles being mounted within said compartment, said baffles defining between them ports which afford a free overall cross-sectional area sufficient to establish a flow velocity for said coolant exceeding the settling rate of suspended particles.

3. The slide valve according to claim 1, wherein said cooling passage, at least in selected portions thereof has a heat-conducting wall in common with said annular passages.

4. The slide valve according to claim 1, wherein additional cooling passages are provided radially outwardly of said annular passages, said additional cooling passages being separately provided with inlet and outlet means annularly arranged around said annular passages adjacent the said axial ends of said housing.

5. The slide valve according to claim 4, wherein said additional cooling passages have a greater cross-sectional area than said annular passages.

6. The slide valve according to claim 4, wherein said additional cooling passages at least partially include heat-conducting walls in common with said annular passages and with said return passage.

7. The slide valve according to claim 4, wherein said inlets and outlets are disposed in part in counter-current relation to said annular passages.

8. The slide valve according to claim 4, wherein the cross-sectional flow areas of said annular passages and of said return passage are sufficiently small to produce a high flow velocity of the coolant, while the cross-sectional flow areas of said cooling passages are selected to be sufficiently large in order to produce a lower velocity of the coolant therethrough.

9. The slide valve according to claim 1, wherein the cross-sectional flow area of said return passage, at least in its lower portion extending over an arc of 180° is less than the overall cross-sectional flow area of said annular passages.

* * * * *

UNITED STATES PATENT OFFICE
CERTIFICATE OF CORRECTION

Patent No. 3,941,186  Dated March 2, 1976

Inventor(s) Heinz Schneider

It is certified that error appears in the above-identified patent and that said Letters Patent are hereby corrected as shown below:

After item (21), insert:

-- (30) Foreign Application Priority Data

June 1, 1973 Germany 2328085 --.

Signed and Sealed this

Third Day of May 1977

[SEAL]

*Attest:*

RUTH C. MASON
*Attesting Officer*

C. MARSHALL DANN
*Commissioner of Patents and Trademarks*